(12) United States Patent
Zhang et al.

(10) Patent No.: US 12,547,417 B2
(45) Date of Patent: Feb. 10, 2026

(54) KERNEL STATE DATA COLLECTION AND RECOVERY OF OPERATING SYSTEM IN A COMPLEX INSTRUCTION SET COMPUTER (CISC) OR REDUCED INSTRUCTION SET COMPUTER (RISC) ARCHITECTURE

(71) Applicant: Dell Products L.P., Round Rock, TX (US)

(72) Inventors: Weibing Zhang, Beijing (CN); Lei Gao, Beijing (CN); Juan Yan, Beijing (CN)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/374,058

(22) Filed: Sep. 28, 2023

(65) Prior Publication Data

US 2024/0320012 A1 Sep. 26, 2024

(30) Foreign Application Priority Data

Mar. 24, 2023 (CN) .......................... 202310305095.7

(51) Int. Cl.
*G06F 9/4401* (2018.01)
*G06F 9/38* (2018.01)

(52) U.S. Cl.
CPC ............ *G06F 9/441* (2013.01); *G06F 9/3836* (2013.01)

(58) Field of Classification Search
CPC ............................... G06F 9/441; G06F 9/3886
See application file for complete search history.

(56) References Cited

U.S. PATENT DOCUMENTS

| 8,862,930 | B2 * | 10/2014 | Horman | G06F 11/1415 |
| | | | | 714/36 |
| 10,684,984 | B2 * | 6/2020 | Tamir | G06F 9/455 |
| 11,714,741 | B2 | 8/2023 | Chen et al. | |
| 11,748,181 | B2 | 9/2023 | Zinger et al. | |
| 2015/0006487 | A1 * | 1/2015 | Yang | G06F 9/461 |
| | | | | 707/649 |

OTHER PUBLICATIONS

Mazen Ezzeddine, "Ubiquitous Computing Platform via Hardware Assisted ISA Virtualization" (Year: 2013).*

(Continued)

*Primary Examiner* — Tammara R Peyton
(74) *Attorney, Agent, or Firm* — BainwoodHuang (57) ABSTRACT

Techniques perform data processing. Such techniques involve obtaining, by a first operating system, first data of a storage system from a data collector. Such techniques further involve synchronizing the first data from the first operating system to a second operating system, wherein an architecture of the second operating system is different from that of the first operating system. Such techniques further involve, in response to that the first operating system has a failure, obtaining, by the second operating system, second data of the storage system from the data collector. Such techniques further involve, in response to that the first operating system is recovered, synchronizing the second data from the second operating system to the first operating system. Accordingly, such techniques can minimize processing time, ensure high availability of data collection, save computing and memory resources of a storage system, and help improve user experience.

20 Claims, 6 Drawing Sheets

(56) References Cited

OTHER PUBLICATIONS

"https://en.wikipedia.org/wiki/Kernel_panic", Wikipedia, 5 pages, retrieved from the Internet Jan. 19, 2024.
"https://en.wikipedia.org/wiki/Kdump_(Linux)", Wikipedia, 3 pages, retrieved from the Internet Jan. 19, 2024.
"https://en.wikipedia.org/wiki/Data_processing_unit", Wikipedia, 1 page, retrieved from the Internet Jan. 19, 2024.

\* cited by examiner

KERNEL STATE DATA COLLECTION AND RECOVERY OF OPERATING SYSTEM IN A COMPLEX INSTRUCTION SET COMPUTER (CISC) OR REDUCED INSTRUCTION SET COMPUTER (RISC) ARCHITECTURE

CROSS-REFERENCE TO RELATED APPLICATION

This application claims priority to Chinese Patent Application No. CN202310305095.7, on file at the China National Intellectual Property Administration (CNIPA), having a filing date of Mar. 24, 2023, and having "METHOD, ELECTRONIC DEVICE AND COMPUTER PROGRAM PRODUCT FOR DATA PROCESSING" as a title, the contents and teachings of which are herein incorporated by reference in their entirety.

TECHNICAL FIELD

Embodiments of the present disclosure relate to the field of computers, and more particularly, to a method, an electronic device, and a computer program product for data processing.

BACKGROUND

A storage system may crash due to defects in software or hardware itself. For example, an operating system in the storage system may not respond during kernel dump processing and system rebooting. During an unresponsive shutdown of the operating system, data collection and classification cannot be performed because the operating system cannot be accessed.

SUMMARY OF THE INVENTION

Embodiments of the present disclosure provide a method, an electronic device, and a computer program product for data processing.

According to a first aspect of the present disclosure, a method for data processing is provided. The method includes obtaining, by a first operating system, first data of a storage system from a data collector, and synchronizing the first data from the first operating system to a second operating system, where an architecture of the second operating system is different from that of the first operating system. The method further includes in response to that the first operating system has a failure, obtaining, by the second operating system, second data of the storage system from the data collector, and in response to that the first operating system is recovered, synchronizing the second data from the second operating system to the first operating system.

According to a second aspect of the present disclosure, a storage system is provided. The storage system includes one or more memories having instructions stored thereon, where the instructions, when executed, cause the storage system to perform actions including: obtaining, by a first operating system, first data of the storage system from a data collector, and synchronizing the first data from the first operating system to a second operating system, where an architecture of the second operating system is different from that of the first operating system. The actions further include in response to that the first operating system has a failure, obtaining, by the second operating system, second data of the storage system from the data collector, and in response to that the first operating system is recovered, synchronizing the second data from the second operating system to the first operating system.

According to a third aspect of the present disclosure, a computer program product is provided. The computer program product is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By description of example embodiments of the present disclosure in more detail in connection with the accompanying drawings, the above and other objectives, features, and advantages of the present disclosure will become more apparent, wherein in the example embodiments of the present disclosure, the same reference numerals generally represent the same elements. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated. Similar drawing marks can represent similar elements.

A storage system may crash due to defects in the software or hardware itself. For example, an operating system in the storage system may not respond during kernel dump processing and system rebooting. During an unresponsive shutdown of the operating system, data collection and classification cannot be performed because the operating system cannot be accessed. After the storage system restarts, due to the consumption of system computing and memory resources by data collection, it takes a long time (usually several hours) for the storage system to fully recover from a crash, which affects the user experience. To make matters worse, scrolling kernel panics and hardware failures can also cause data collection to fail.

On the other hand, data collection can help locate and root cause problems in the storage system, which helps users quickly get rid of running vulnerable software. Data collection is a maintainable feature that provides extensible system-wide utilities to collect static and dynamic information. These collected information can be used to classify system failures and issues. For example, when an internal fatal error is detected in the operating system kernel, information about the error can be collected, such as memory dumps, stack traces, and system logs, to help diagnose and debug the cause of the kernel error.

Kernel panic is a condition that occurs when the operating system kernel in a storage system detects an internal fatal error. In this case, either the operating system kernel cannot be safely recovered, or continuing to run the system will face a higher risk of significant data loss. Panic may occur due to hardware failures or software errors in the operating system. In many cases, the operating system can continue to run after an error has occurred. However, the system is in an unstable state, and in order to avoid the risk of security vulnerabilities and data corruption, the operating system is stopped to prevent further corruption and promote error diagnosis, and is typically restarted.

To avoid kernel panic, there is a Kdump function in the kernel of an operating system such as Linux, which can create a failure dump in an event of a Linux kernel crash or failure. For example, after kernel panic is triggered, kdump can export a memory image (also referred to as vmcore), which can be analyzed for debugging and determining the cause of the crash. In a case of kernel panic, kdump maintains system consistency by starting another Linux kernel (referred to as a dump capture kernel) and using it to export and save memory dumps. Therefore, the system boots into a clean and reliable environment, rather than relying on a crashed kernel that may cause various problems, such as causing corruption of a file system when writing memory dump files.

The current storage system may have a very large number of storage configuration files, and kdump will take a long time to complete the dump and compress the dump output. During this process, the storage system cannot accept user commands to avoid contamination of the memory by new user operations. Data collection requests must wait until the storage system is restarted to a normal state. Therefore, the storage system enters a scrolling kernel panic state and cannot execute data collection until the hardware problem is fixed.

However, for various applications and services, the storage system typically requires "five 9" availability (99.999% normal running time) or "six 9" availability (99.9999% normal running time). The current data collection method cannot meet the stability required when the storage system fails. For example, data collection cannot be performed when the storage system fails. This will slow down the root cause and resolution process, as it will delay classification and repair. The user experience will be affected because users have to take the risk of running vulnerable systems for a longer time.

In addition, a data collection process takes a long time, which will consume computing resources and storage resources of a server CPU, and system recovery will be delayed. Before the data collection is completed, I/O performances will be affected. Scrolling the kernel panic and hardware failures will make problems worse, because data collection will be completely stopped. During a server crash, some hardware computing/memory resources will not be available because user I/O cannot be provided.

To at least solve the above and other potential problems, embodiments of the present disclosure provide a method for data processing. The method includes obtaining, by a first operating system, first data of a storage system from a data collector, and synchronizing the first data from the first operating system to a second operating system, where an architecture of the second operating system is different from that of the first operating system. The method further includes in response to that the first operating system has a failure, obtaining, by the second operating system, second data of the storage system from the data collector, and in response to that the first operating system is recovered, synchronizing the second data from the second operating system to the first operating system. The method can minimize processing time, ensure high availability of data collection, and save computing and memory resources of a storage system.

The instant data collection method according to the present disclosure may improve traceability of a storage system. Once a failure or a crash of the storage system is detected, instant data collection can be performed. This helps accelerate the handling of critical system panic issues so as to ensure the user experience. An internal high-availability system is used to perform data collection during the failure of the storage system. This helps reduce the workload of rapid recovery of the storage system, and helps speed up the handling of critical issues such as system crashes. Even if the system has a hardware failure or a failure, remedial data collection can still be performed. It also helps improve the user experience to quickly get rid of vulnerable systems.

Figure 1:
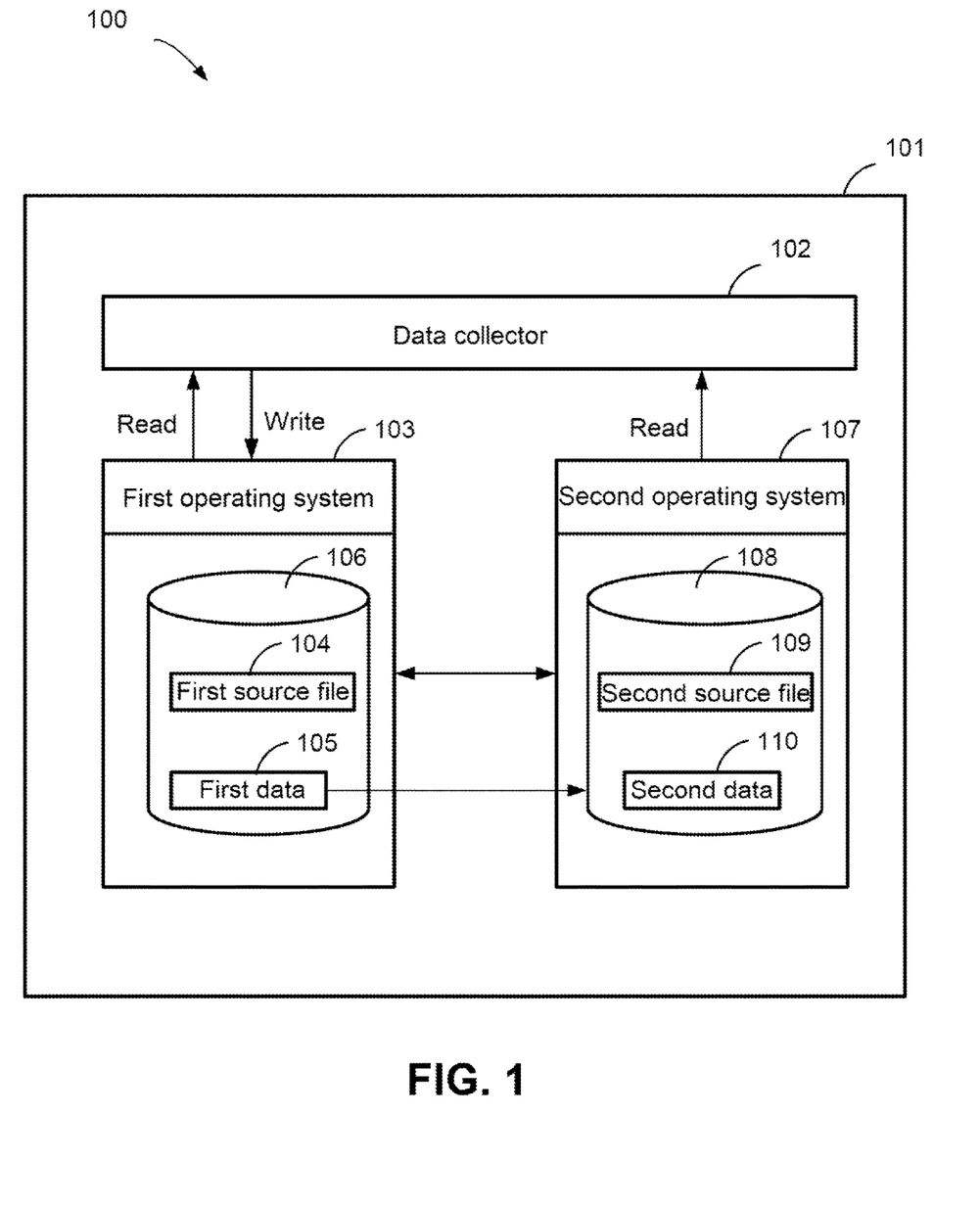
FIG. 1 shows a schematic diagram of an example environment in which a device and/or a method according to embodiments of the present disclosure can be implemented.

The fundamental principles and a plurality of example embodiments of the present disclosure will be described in detail below with reference to the accompanying drawings. FIG. 1 illustrates a schematic diagram of an example environment 100 in which a device and/or a method according to embodiments of the present disclosure can be implemented. It should be understood that the number, arrangement, and data transmission process of elements or components such as devices, operating systems, and the data collector shown in FIG. 1 are only illustrative. The example environment 100 can include different numbers of devices, operating systems, data collectors, and various additional elements that are arranged in different ways. This is not limited in the present disclosure.

In the example environment 100, a storage system 101 may be any device that has processing computing resources or storage resources. For example, a computing device 101 can have common capabilities such as receiving and sending data requests, real-time data analysis, local data storage, and real-time network connectivity. The computing device may typically include various types of devices. Examples of the computing device may include, but are not limited to, desktop computers, laptop computers, smartphones, wearable devices, security devices, smart manufacturing devices, smart home devices, Internet of Things (IoT) devices, smart cars, drones, and the like. It should be understood that although only the computing device 101 is shown in FIG. 1, this is only illustrative and not a specific limitation to the present disclosure. In the example environment 100, any number and type of devices can be included, and this is not limited in the present disclosure.

Alternatively or additionally, the storage system 101 can also be any cloud computing device with storage capabilities, such as general-purpose servers, dedicated servers, desktop servers, rack servers, cabinet servers, blade servers, and the like. This is not limited in the present disclosure. The cloud computing device can also be a shared pool of configurable computing resources (including but not limited to services, processing, computing, storage, etc.) that can be easily accessed through a network. The types of services that the cloud computing device can provide include, but are not limited to, Infrastructure as a Service (IaaS), Platform as a Service (PaaS), and Software as a Service (SaaS). IaaS can provide services for basic resources such as hardware devices (such as CPUs, memories, and disks), PaaS can provide services for platform resources such as an operating environment of applications (such as operating systems, databases, and middleware), and SaaS can provide services for software resources such as the applications themselves (such as office software, games, and social networks).

The cloud computing device may further be deployed as a private cloud, a community cloud, a hybrid cloud, and the like, and the present disclosure is not limited in this regard. The cloud computing device can also have features such as providing computing capabilities based on user needs, and being compatible with different software or hardware. Additionally or alternatively, any localized architecture can also be used to implement the cloud computing device.

Additionally or alternatively, the storage system 101 can also be one or more computer high-availability clusters (also referred to as high-availability (HA) clusters) supporting server applications that can be reliably used with minimal downtime. They are run by using high-availability software to utilize redundant computer clusters to provide continuous services in the event of system component failures. Without a cluster, if a storage server fails or crashes, the storage server will not be available until the failed or crashed storage server is fixed. The storage system 101 can remedy this situation by detecting hardware/software failures and immediately use another system to take over.

The storage system 101 may include a data collector 102, and the data collector 102 can be based on an operating system in the storage system 101 and is used to collect various known or unknown programs associated with operating system data. This is not limited in the present disclosure. For example, in the context of the Windows operating system, the data collector 102 may be a Windows process data collector, which can collect usage data for processes running on the Windows system, and generate log file data for these data. For example, the Windows process data collector can collect relevant data such as the name and path of a process, the name of a computer on which the process is running, the name of a user who created the process, CPU time consumed by the process (cumulative time, broken down by the kernel and the user time), the number of bytes read and written by the process, an operating system version, a list of installed patches, data transfer, data deletion, and system management. Additionally or alternatively, the Windows process data collector can also collect data usage situations such as a total amount of available and used memories, a total CPU utilization ratio, and the total kernel/user/idle time in the operating system. This is not limited in the present disclosure. The data collector 102 can generate log data based on the collected data, and the log data can record files that record events that occur during the running of the operating system or other software, or files of messages between different users of communication software.

For example, in some embodiments, a first operating system 103 may also include first source file data 104, which may be application data generated by an application in the first operating system 103 during the running process.

For example, in some embodiments, the first source file data 104 may include non-executable files that the application depends on, such as XAML and the like. The first source file data 104 may be compiled into executable files or data files of a class library. The data collector 102 can then record and collect the first source file data 104 to generate log data associated with these first source file data 104.

Data collection can be widely used by technical support teams, electronic engineering teams, and technical customer engineer teams to solve customer issues, such as understanding customer business scenarios and technical requirements, and collecting customer feedback, complaints, and suggestions, thereby providing appropriate product or scheme recommendations, and improving the user experience. Data collection can also be used by development teams and/or quality engineer teams for internal problem analysis, such as product quality control and improvement, including new product design and process development, stability testing, document standards, and quality control plan, production, testing, and other aspects.

When customers/support personnel find a problem with the overall system, they can manually start data collection. When there is a new kernel dump on an array, data collection can also be automatically triggered. Data collection needs to run on an active operating system because it needs to collect predefined sets of files on a file system. This process may take several hours and consume a large amount of CPU computing resources/memory resources, since files need to be collected and compressed to reduce the use of storage space and bandwidth during subsequent data transfers.

For example, when a kernel error occurs, data collection can print out detailed error information, including error code, register values, stack trace, loaded modules, etc. These information can be displayed on a screen or output to a serial port or network. In some cases, data collection can also dump current memory data to a specific partition or file for subsequent analysis, and can start a backup kernel in the event of an error and obtain crash information from the original kernel. In some cases, data collection can also collect, by means of a log system, relevant error log information when a system failure occurs, and send the error log information to a log server for real-time or offline log analysis.

Therefore, the data collection function allows developers to save system configurations and status as well as logs, analyze core dump files, and extract information summaries from core files. Data collection can collect a set of pre-defined diagnostic data from each of the storage systems on the overall system. The diagnostic data collected includes settings, logs, code versions, and other information critical to offline classification and resolving customer issues.

Log data can include kernel and system logs, user logs, and application logs. The kernel and system logs can record information such as locations recorded by the kernel and system program messages. User logs record messages such as login and logout of users in the operating system, such as time, a location (IP), a user name (or a service name), a terminal logged in, login time, a host used, processes executed, and operations performed. Application logs are logs recorded by the application itself, such as server log information, database log information, etc. This is not limited in the present disclosure.

Additionally or alternatively, in some embodiments, the data collector 102 may also be a data collector based on the Linux operating system, such as Beats, Sysstat, and Linux information collection commands, etc. This is not limited in the present disclosure.

The storage system 101 may also include a first operating system 103, and the first operating system 103 may be an operating system that can be used to control the storage system 101 and is based on Complex Instruction Set Computing (CISC). For example, in some embodiments, the first operating system 103 may be a Windows operating system, a Linux operating system, or a Unix operating system based on an Intel or AMD x86 architecture. This is not limited in the present disclosure. The first operating system 103 may control and manage various resources of the storage system 101. For example, the first operating system 103 may allocate and manage hardware, software, and data resources, and allocate and reclaim resources of a memory 106, schedule when shared resources conflict, store and protect data, control program running, provide a friendly human-computer interaction interface, provide support for other application software, and so on, so as to maximize the utilization of all resources in the storage system 101, provide various forms of user interfaces, provide users with a good working environment, and provide necessary services and corresponding interfaces for the development of other software.

The first operating system 103 can subsequently store first data 105 that is collected by the data collector 102 and includes data such as logs associated with the first operating system 103 into a memory 106 of the first operating system 103. Then, the first operating system 103 can transmit the first data 105 to a second operating system via a data connection such as an I/O interface. The I/O interface can include an I/O bus, a terminal interface, a storage interface, an I/O device interface, a network interface, etc. The I/O interface can guide instructions and data from a processor and the memory 106 to the I/O bus. The I/O interface can also guide instructions and data from various interfaces of the I/O bus to the processor and the memory 106.

In the storage system 101, the second operating system 107 can be an operating system based on a data processing unit (DPU). The DPU can be a channel controller with programmable dedicated electronic circuits and can perform hardware acceleration of data processing for data centric computing. The DPU generally includes a CPU, an NIC, and a programmable data acceleration engine. This enables the DPU to have the versatility and programmability of a central processing unit, while being specifically designed to efficiently handle data processing, data compression, and data analysis requests.

The DPU provides capabilities for accelerating IO processing and improving performance. In some embodiments, the DPU runs the second operating system 107 independently from the first operating system 103 of the storage system 101. A start process of the first operating system 103 of the storage system 101 and that of the second operating system 107 of the DPU are separated from each other. During a period in which the first operating system 103 of the storage system 101 has a failure or even a crash, the second operating system 107 of the DPU can still continue running, but the workload on the DPU will become idle, because the storage system 101 cannot provide services for the user IO.

In some embodiments, the second operating system 107 can be an operating system based on a reduced instruction set computer (RISC) architecture. For example, the second operating system 107 can be a real-time operating system (RTOS) based on an advanced RISC machine (ARM) architecture, FreeRTOS, an embedded operating system, etc., and this is not limited in the present disclosure. The architecture of an operating system used by the second operating system 107 may be different from that of an operating system used by the first operating system 103. For example, when the first operating system 103 is an operating system based on a complex instruction set computer, the second operating system 107 may be an operating system based on a reduced instruction set computer.

In response to receiving the first data 105 from the first operating system 103, the second operating system 107 can store the first data 105 in a local memory 108. Additionally or alternatively, in some embodiments, the second operating system 107 may also include second source file data 109 of itself, and these second source file data 109 may be application data generated by an application in the second operating system 103 during the running process. The data collector 102 can then record and collect the second source file data 109 so as to generate log data associated with these second source file data 109.

In some embodiments, to avoid writing repeated redundant data, the data collector 102 can read associated data from the first operating system 103 and write the associated data to the first operating system 103 when both the first operating system 103 and the second operating system 107 are running normally; meanwhile, the data collector 102 reads associated data from the second operating system 107 while not writing the associated data into the second operating system 107. In some embodiments, the first operating system 103 and the second operating system 107 can send detection signals to each other to confirm whether the other operating system is running normally.

According to the embodiments of the present disclosure, the storage system 101 may be a distributed replicated block device (DRBD), which is a distributed replicated storage system based on a Linux platform. The DRBD layers logical block devices on existing local block devices participating in a cluster device. Writes from the DRBD to, for example, a primary node of the first operating system 103 can be transmitted to lower-level block devices and simultaneously propagated to, for example, an auxiliary node of the second operating system 107. Then, the auxiliary node transfers the data to its corresponding subordinate block device. If the primary node fails, a cluster management process will elevate the auxiliary node to the primary node state. In the present disclosure, the DRBD is used to provide shared storage for HA clusters.

A storage server uses a storage space provided by the DRBD to store data collection source files and outputs. For the primary node, the storage can be set to a read/write mode, and for the auxiliary node, the storage will be set to read-only. Any changes made to the primary node will be replicated to the auxiliary node. When a storage server crash is detected, the auxiliary node (DPU OS) can set the storage to be readable/writable, and use DPU computing and memory resources to initiate automatic data collection. After the storage server is fully recovered from the crash, it will synchronize with the auxiliary node and set its DRBD device to be readable/writable, once again serving as the primary node.

Therefore, internal high-availability clusters can be formed through next-generation hardware such as the DPU, sharing storage resources between a storage server operating system and a DPU operating system. The active backup shared storage of data collection source files is used for data collection in the event of a storage system failure. For normal data collection requests, data collection will be performed on a primary node, i.e., the storage server operating system. When a crash or kernel panic of the storage system is detected, automatic data collection will be performed on the auxiliary node (DPU OS) according to the configuration. Even in the event of a scrolling kernel panic or hardware failure, data collection can still be executed in the auxiliary node. At the same time, the excellent data processing and compression functions of the DPU can also be utilized during a data collection process.

Although a schematic diagram of an example environment 100 in which a device and/or a method according to the embodiments of the present disclosure can be implemented is described above with reference to FIG. 1, it can be understood by those skilled in the art that the method for data processing according to the embodiments of the present disclosure may not be limited to the scenario described above, but may also be applied as needed to any scenario where data processing is required, and the present disclosure does not limit the application scenario. A flow chart of a method 200 for data processing according to the embodiments of the present disclosure will be described below with reference to FIG. 2.

Figure 2:
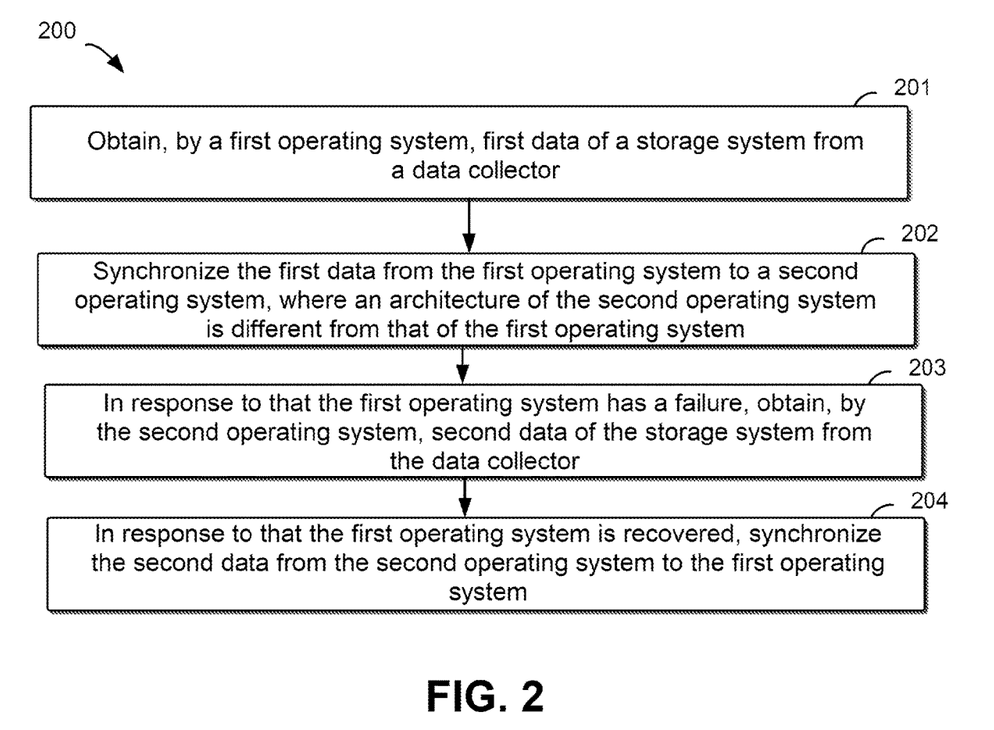
FIG. 2 shows a frame diagram of a method for data processing according to embodiments of the present disclosure.

At block 201, first data of a storage system is obtained from a data collector. According to the embodiments of the present disclosure, the data collector 102 may first perform data collection on a first source file 106 in a first operating system 103 of a storage system 101, so as to acquire data information associated with the first operating system 103 and programs and processes running therein, and generate first data 105. The first operating system 103 can then store the first data 105 collected by the data collector 102 into a local memory 106.

At block 202, the first data is synchronized from the first operating system to a second operating system, where an architecture of the second operating system is different from that of the first operating system. According to the embodiments of the present disclosure, the first operating system 103 may synchronize the first data 105 to the second operating system 107 via a data connection with the second operating system 107 such as PCIe and the like. In other words, once the first operating system 103 obtains the first data 105, the first operating system 103 may instantly transmit the data to the second operating system 107. In some embodiments, the first operating system 103 can be an operating system based on a complex instruction set computer, for example, a Windows operating system based on an Intel x86 architecture, while the second operating system 107 may be an operating system based on a reduced instruction set computer, for example, ARM architecture-based Ubuntu, Debian, Fedora, macOS Big Sur, and the like. This is not limited in the present disclosure.

At block 203, in response to that the first operating system has a failure, the second operating system obtains second data of the storage system from the data collector. According to the embodiments of the present disclosure, the first operating system 103 and the second operating system 107 may send detection signals to each other, so as to detect whether the other system works normally. For example, after the second operating system 107 sends a detection signal to the first operating system 103, the first operating system 103 does not correspondingly send a signal of confirming reception to the second operating system 107, and therefore, the second operating system 107 may determine that the first operating system 103 has a running failure.

The running failure of the first operating system 103 can include situations where the kernel of the operating system experiences serious errors and cannot continue to run due to hardware failures, memory leaks, and driver defects; operating system startup failures caused by boot loader configuration errors, file system corruption, insufficient disk space, bad disk tracks, operating system corruption, or incorrect CMOS settings; network interruption failures of the operating system caused by network card driver issues, network configuration issues, and firewall settings issues; operating system process deadlock failures caused by process logic errors, resource contention deadlocks, and the like; failures such as excessive CPU usage or memory usage in server computing devices due to malware attacks, resource leakage issues, and service configuration issues, and that ultimately leads to excessive operating system load; and situations where any operation cannot be performed due to random downtime caused by viruses, hardware conflicts, software compatibility, overly high temperatures, or unstable power supplies. It should be understood that the situations of running failures listed in the present disclosure are only illustrative, and this is not limited in the present disclosure.

When the second operating system 107 detects that the first operating system 103 has a running failure, the second operating system 107 can instantly obtain second data 110 from the data collector 102. In other words, the data collector 102 may turn to write the second data 110 into the second operating system 107. Different from the first data 105, the second data 110 can record corresponding running situations of various programs, processes, and hardware in the first operating system 103 at a moment when the first operating system 103 has a running failure and the subsequent time. Since the first operating system 103 and the second operating system 107 are based on different computer architectures and the two operating systems are running independently, when encountering situations that cause the first operating system 103 to have a failure, these situations do not necessarily cause the second operating system 107 to have a failure. Therefore, the second operating system 107 can continue to run and collect, by means of the data collector 102, relevant second data 110 that records the cause of the failure of the first operating system 103.

In some embodiments, the second operating system 107 may analyze the first data 105 and the second data 110 transmitted by the first operating system 103, for example, perform data comparison on the first data 105 and the second data 110 to identify abnormal values existing in the second data 110, and determine causes of failures based on the abnormal values. Operation and maintenance personnel can also repair the first operating system 103 which has a failure based on the analysis of the first data 105 and the second data 110, such as replacing hardware and disks, installing patches, and updating the system. During the failure of the first operating system 103, the second operating system 107 can also replace the first operating system 103 to handle various transactions in the storage system, such as I/O requests, computing resource allocation, etc. This is not limited in the present disclosure.

At block 204, in response to that the first operating system is recovered, the second data is synchronized from the second operating system to the first operating system. According to the embodiments of the present disclosure, when the first operating system 103 is recovered from the failures, the second operating system 107 may synchronously transmit the second data 110 to the first operating system 103 to maintain data consistency between the two operating systems, and the first operating system 103 can also use the second data 110 to avoid next failure.

A flow chart of a method for data processing according to the embodiments of the present disclosure is described above with reference to FIG. 2. According to the method implemented in the present disclosure, data synchronization can be achieved in real time, and it is ensured that a storage system can continue to run normally in the event of an operating system failure. A schematic diagram 300 in which an operating system continues working when the other operating system has a failure according to the embodiments of the present disclosure is described below with reference to FIG. 3. Elements or components in FIG. 3 may be identical or similar to elements or components in FIG. 1.

Figure 3:
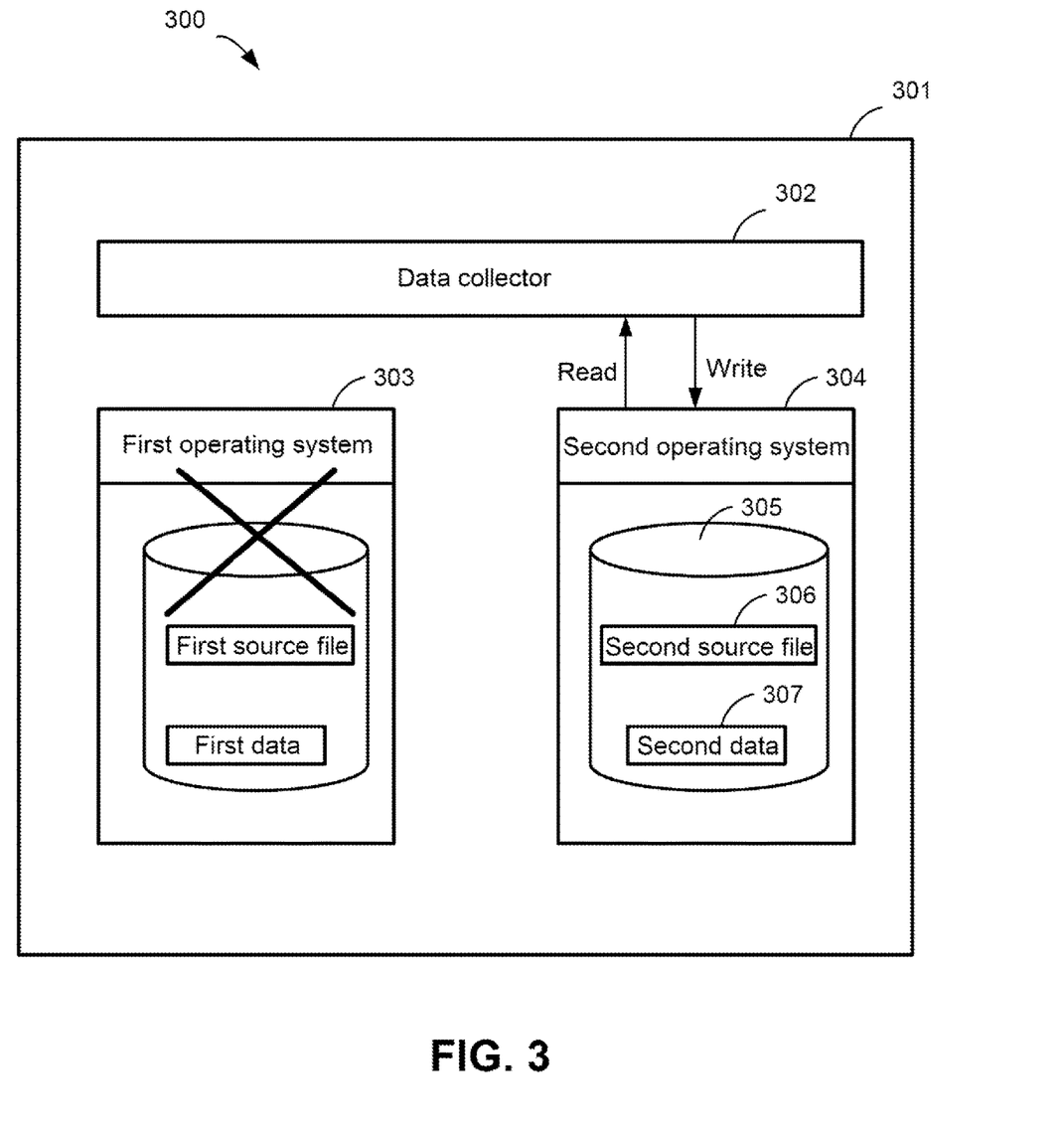
FIG. 3 shows a schematic diagram in which an operating system continues working when another operating system has a failure according to embodiments of the present disclosure.

As shown in FIG. 3, in a storage system 301, when a first operating system 303 has a failure, a data collector may instead continue writing second data 307 into a memory 305 of a second operating system 304. The second data 307 may include relevant information associated with the cause of the failure of the first operating system 303. The second operating system 304 can analyze the cause of the failure of the first operating system by combining the previously written data with the second data 307.

Additionally or alternatively, a data collector 302 may also collect relevant data of a second source file 306 of the second operating system 304 to synchronize with the first operating system 303 when the first operating system 303 is recovered to normal running. Additionally or alternatively, after the first operating system 303 is recovered to normal running, in order to avoid writing repeated redundant data, the data collector 302 can stop writing data to the second operating system and read data from the second operating system 304.

In some embodiments, there may be a situation where the first operating system 303 and the second operating system 304 fail simultaneously due to external power interruption or other reasons. In this case, the second data 307 may not have been synchronized to the second operating system 304 in time. Therefore, after both the first operating system 303 and the second operating system 304 are recovered to normal running, the storage system 301 may compare data in the first operating system 303 with data in the second operating system 304 to confirm whether the second data 307 has been synchronized to the second operating system 304. If the second data 307 is not synchronized to the second operating system 304, the first operating system 303 may synchronize the second data 307 to the second operating system 304.

For example, in some embodiments, in the ongoing data collection that encounters an interruption due to a power reset, both a server operating system and a DPU operating system will be reset. If the two operating systems are started and an internal cluster is successfully recovered, the cluster will synchronize the data to latest changes. The data collection status will be saved in the shared storage, and data collection requests that are not completed previously can be processed in a primary node. If any of the operating systems fails to start or fails to join a cluster after restart and needs to execute the data collection that are not completed previously, a data collection output directory on each available node can be checked, and the data collection that are not completed previously is determined to continue or a new data collection is started, as the previous data collection output may not be available due to the unavailability of the node.

Figure 4:
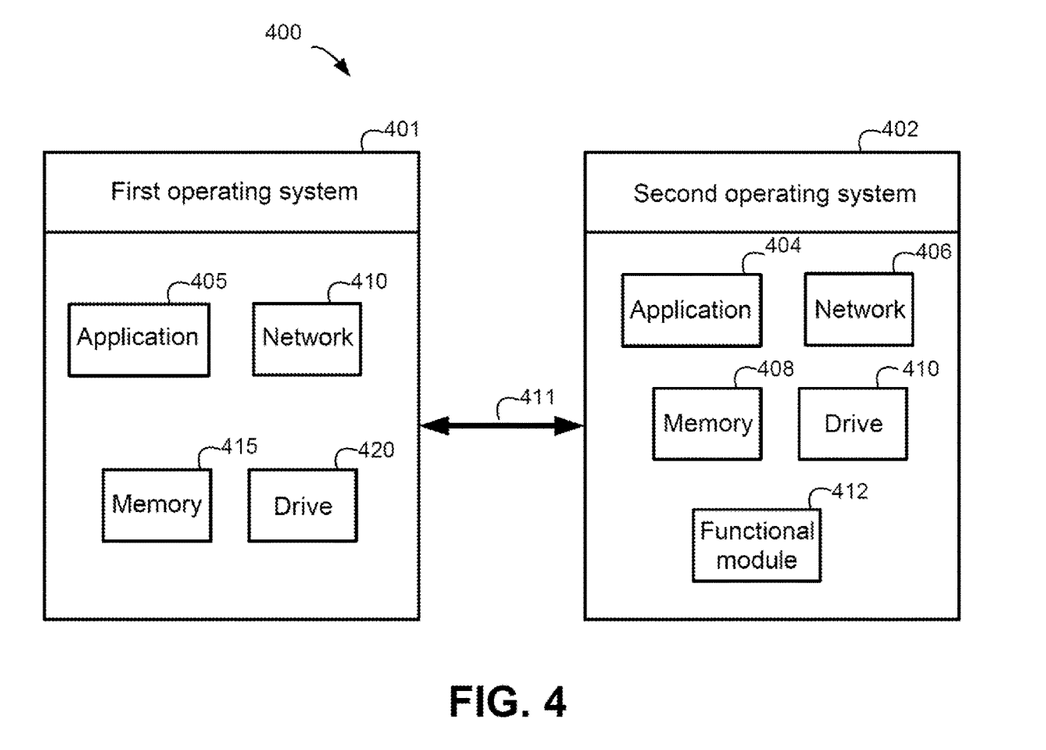
FIG. 4 shows a schematic diagram of internal constructions of a first operating system and a second operating system.

FIG. 4 shows a schematic diagram 400 of internal constructions of a first operating system 401 and a second operating system 402. Elements or components in FIG. 4 can be identical or similar to the elements or components in FIGS. 1 and 3. As shown in FIG. 4, the first operating system 401 can include elements such as an application program 405, a network interface 410, a memory 415, and a driver program 420. The first operating system 401 can be driven by a driver 420. The application program 405 in the first operating system 401 can be stored in a memory 415 and communicated with an external device via the network interface 410. The first operating system 401 can also synchronize data with the second operating system 402 via a bus 411.

Similarly, the second operating system 402 can also include similar elements such as an application program 404, a network interface 406, a memory 408, and a driver program 410. The second operating system 402 may also include a functional module 412 for implementing specific functions or calculations. For example, the functional module 412 can be a graphics card module for image processing, or the like. When the first operating system 401 has a failure, the functional module 412 in the second operating system 402 can process and analyze the data collected by the data collector.

Figure 5:
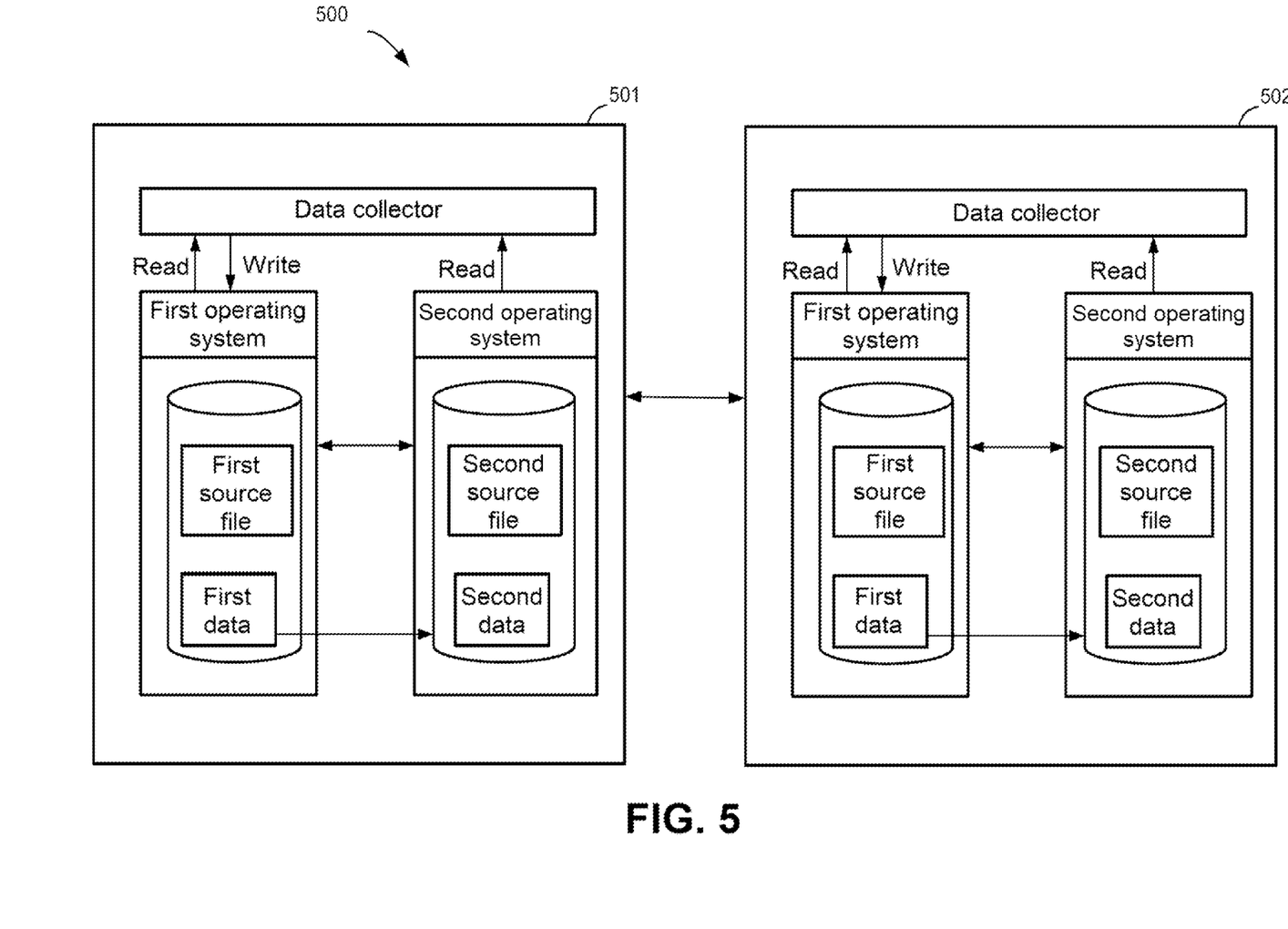
FIG. 5 shows a schematic diagram of a high-availability cluster composed by one or more storage systems according to embodiments of the present disclosure.

FIG. 5 shows a schematic diagram of a high-availability cluster 500 composed by one or more storage systems according to the embodiments of the present disclosure. As shown in FIG. 5, the high-availability cluster 500 may include a storage system 501 and a storage system 502. The storage system 501 and the storage system 502 may have elements or components that are identical or similar to the storage system described in FIGS. 1 and 3. For example, all of them can have one or more operating systems, and the operating systems may all have source files, storage data, and the like. This is not limited in the present disclosure.

The storage system 501 and the storage system 502 can transmit data to each other so as to implement redundant backup of data. Therefore, in some embodiments, when one or more storage systems in the storage system 501 and the storage system 502 have a failure or panic, the other system can instantly replace the storage system which has a failure, and continue performing data backup, so as to implement "five 9" availability (99.999% normal running time) or "six 9" availability (99.9999% normal running time) of the high-availability cluster 500. Additionally or alternatively, the storage system 501 and the storage system 502 may also have more elements or components. This is not limited in the present disclosure. It should be understood that according to the embodiments of the present disclosure, the high-availability cluster 500 may include more or fewer storage systems. This is not limited in the present disclosure.

Figure 6:
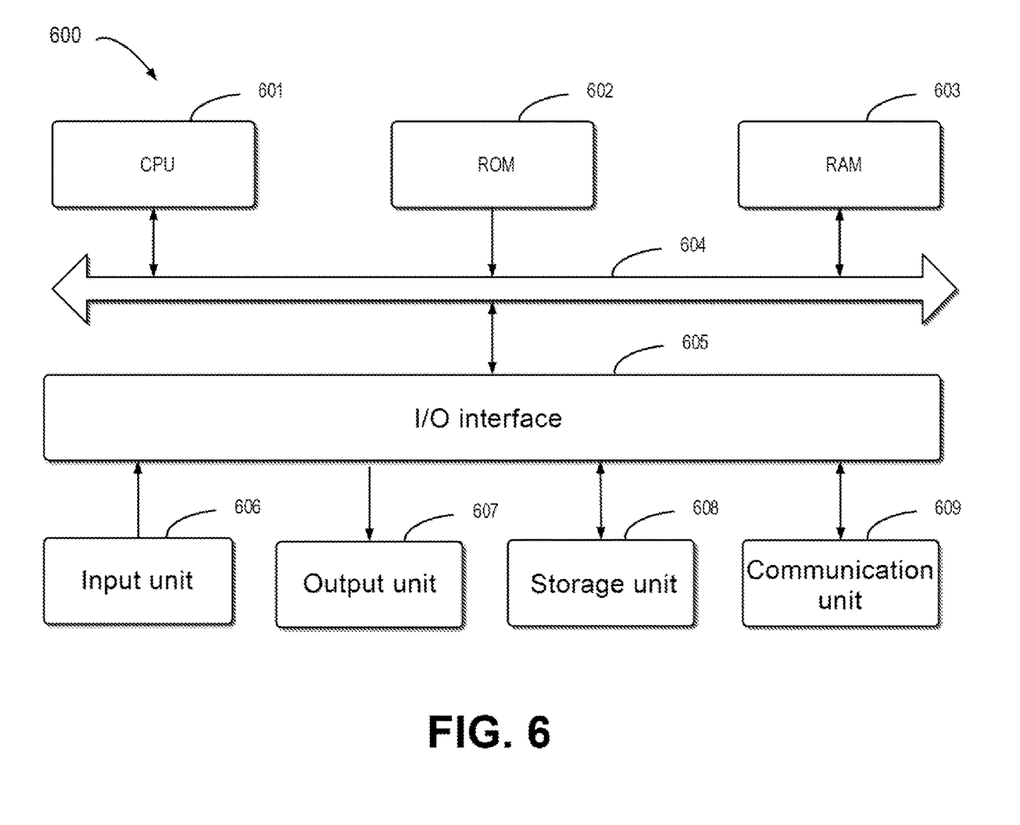
FIG. 6 illustrates a schematic block diagram of an example device suitable for implementing embodiments of the present disclosure.

FIG. 6 shows a schematic block diagram of an example device 600 that may be used to implement the embodiments of the present disclosure. The computing device in FIG. 1 may be implemented using the device 600. As shown in the figure, the device 600 includes a central processing unit (CPU) 601 that may execute various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. A CPU 601, a ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage page 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various processes and processing described above, such as the method 200, may be performed by a processing unit 601. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. One or more actions of the method 200 described above may be performed when the computer program is loaded into the RAM 603 and executed by the CPU 601.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for data processing, comprising:
   obtaining, by a first operating system, first data of a storage system from a data collector, the first data including kernel and system logs associated with the first operating system;
   synchronizing the first data from the first operating system to a second operating system, wherein an architecture of the second operating system is different from that of the first operating system;
   detecting that the first operating system has a running failure, the running failure including a kernel error of the first operating system;
   in response to detecting that the first operating system has the running failure, obtaining, by the second operating system, second data of the storage system from the data collector, the obtaining of the second data comprising performing one or more of:
   obtaining, at a time of occurrence of the running failure, one or more first records of running situations of one or more programs in the first operating system; and
   obtaining, at a time subsequent to the occurrence of the running failure, one or more second records of running situations of the one or more programs in the first operating system;
   recovering the first operating system from the running failure to a normal running state using the first data and the second data obtained from the data collector; and
   in response to recovering the first operating system from the running failure to the normal running state, synchronizing the second data from the second operating system to the first operating system.

2. The method according to claim 1, wherein obtaining, by the second operating system, the second data of the storage system from the data collector further comprises:
   in response to detecting that the first operating system has the running failure:
   writing, by the data collector, the second data into the second operating system; and
   reading the second data from the second operating system.

3. The method according to claim 2, further comprising:
   in response to recovering the first operating system is from the running failure to the normal running state, stopping writing, by the data collector, the second data into the second operating system.

4. The method according to claim 1, further comprising:
   when both the first operating system and the second operating system have a respective running failure and are recovered, performing, by the storage system, data comparison on the first operating system and the second operating system.

5. The method according to claim 4, wherein performing, by the storage system, the data comparison on the first operating system and the second operating system comprises:
   in response to an inconsistency of the data comparison between the first operating system and the second operating system, transmitting, by the storage system, the second data to the second operating system.

6. The method according to claim 1, further comprising:
   in response to detecting that the first operating system has the running failure, analyzing, by the second operating system based on the first data and the second data, a cause of the running failure of the first operating system.

7. The method according to claim 1, further comprising:
   sending, by the second operating system, a detection signal to the first operating system, so as to detect whether the first operating system has the running failure or is normally running.

8. The method according to claim 1, further comprising:
   when the first operating system is normally running, reading the first data from the second operating system.

9. The method according to claim 1, wherein the first operating system is based on a complex instruction set computer (CISC) architecture, and the second operating system is based on a reduced instruction set computer (RISC) architecture.

10. A storage system, comprising:
    one or more memories having instructions stored thereon, wherein the instructions, when executed, cause the storage system to perform actions comprising:

obtaining, by a first operating system, first data of the storage system from a data collector, the first data including kernel and system logs associated with the first operating system;

synchronizing the first data from the first operating system to a second operating system, wherein an architecture of the second operating system is different from that of the first operating system;

detecting that the first operating system has a running failure, the running failure including a kernel error of the first operating system;

in response to detecting that the first operating system has the running failure, obtaining, by the second operating system, second data of the storage system from the data collector, the obtaining of the second data comprising performing one or more of:

obtaining, at a time of occurrence of the running failure, one or more first records of running situations of one or more programs in the first operating system; and obtaining, at a time subsequent to the occurrence of the running failure, one or more second records of running situations of the one or more programs in the first operating system;

recovering the first operating system from the running failure to a normal running state using the first data and the second data obtained from the data collector; and in response to recovering the first operating system is from the running failure to the normal running state, synchronizing the second data from the second operating system to the first operating system.

11. The storage system according to claim 10, wherein obtaining, by the second operating system, the second data of the storage system from the data collector further comprises:

in response to detecting that the first operating system has the running failure, writing, by the data collector, the second data into the second operating system, and reading the second data from the second operating system.

12. The storage system according to claim 11, wherein the actions further comprise:

in response to recovering the first operating system from the running failure to the normal running state, stopping writing, by the data collector, the second data into the second operating system.

13. The storage system according to claim 10, wherein the actions further comprise:

when both the first operating system and the second operating system have a respective running failure and are recovered, performing, by the storage system, data comparison on the first operating system and the second operating system.

14. The storage system according to claim 13, wherein performing, by the storage system, the data comparison on the first operating system and the second operating system further comprises:

in response to an inconsistency of the data comparison between the first operating system and the second operating system, transmitting, by the storage system, the second data to the second operating system.

15. The storage system according to claim 10, wherein the actions further comprise:

in response to detecting that the first operating system has the running failure, analyzing, by the second operating system based on the first data and the second data, a cause of the running failure of the first operating system.

16. The storage system according to claim 10, wherein the actions further comprise:

sending, by the second operating system, a detection signal to the first operating system, so as to detect whether the first operating system has the running failure or is normally running.

17. The storage system according to claim 10, wherein the actions further comprise:

when the first operating system is normally running, reading the first data from the second operating system.

18. The storage system according to claim 10, wherein the first operating system is based on a complex instruction set computer (CISC) architecture, and the second operating system is based on a reduced instruction set computer (RISC) architecture.

19. A computer program product having a non-transitory computer readable medium which stores a set of instructions to perform data processing; the set of instructions, when carried out by computerized circuitry, causing the computerized circuitry to perform a method of:

obtaining, by a first operating system, first data of a storage system from a data collector, the first data including kernel and system logs associated with the first operating system;

synchronizing the first data from the first operating system to a second operating system, wherein an architecture of the second operating system is different from that of the first operating system;

detecting that the first operating system has a running failure, the running failure including a kernel error of the first operating system;

in response to detecting that the first operating system has the running failure, obtaining, by the second operating system, second data of the storage system from the data collector, the obtaining of the second data comprising performing one or more of:

obtaining, at a time of occurrence of the running failure, one or more first records of running situations of one or more programs in the first operating system; and obtaining, at a time subsequent to the occurrence of the running failure, one or more second records of running situations of the one or more programs in the first operating system;

recovering the first operating system from the running failure to a normal running state using the first data and the second data obtained from the data collector; and in response to recovering the first operating system is from the running failure to the normal running state, synchronizing the second data from the second operating system to the first operating system.

20. The computer program product according to claim 19, wherein obtaining, by the second operating system, the second data of the storage system from the data collector further comprises:

in response to detecting that the first operating system has the running failure, writing, by the data collector, the second data into the second operating system, and reading the second data from the second operating system.

* * * * *